US012812382B2

(12) United States Patent
Rajput et al.

(10) Patent No.: US 12,812,382 B2
(45) Date of Patent: Nov. 24, 2026

(54) METHODS, SYSTEMS, AND COMPUTER READABLE MEDIA FOR DYNAMICALLY ADJUSTING SERVICE-BASED INTERFACE (SBI) MESSAGE PRIORITY FOR ROAMING TRAFFIC

(71) Applicant: Oracle International Corporation, Redwood Shores, CA (US)

(72) Inventors: Jay Rajput, Bangalore (IN); Virendra Singh, Bangalore (IN); Shashikiran Bhalachandra Mahalank, Bangalore (IN); Ashish Kumar, Gurgaon (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 163 days.

(21) Appl. No.: 18/964,300

(22) Filed: Nov. 29, 2024

(65) Prior Publication Data

US 2026/0156473 A1 Jun. 4, 2026

(51) Int. Cl.
*H04W 12/30* (2021.01)
*H04W 8/12* (2009.01)

(52) U.S. Cl.
CPC ............. *H04W 12/30* (2021.01); *H04W 8/12* (2013.01)

(58) Field of Classification Search
CPC ........ H04W 12/30; H04W 8/12; H04L 63/20; H04L 63/0281
See application file for complete search history.

(56) References Cited

U.S. PATENT DOCUMENTS 11,483,741 B2 * 10/2022 Nair .................... H04L 41/5003
12,452,140 B1 * 10/2025 Rajput .................... H04L 41/14
2023/0147549 A1 * 5/2023 Singh .................. H04L 41/5041
709/223

(Continued)

FOREIGN PATENT DOCUMENTS

WO WO-2024033782 A1 * 2/2024 ............. H04L 69/40
WO WO-2025052166 A1 * 3/2025 ............ H04W 12/12

OTHER PUBLICATIONS

3GPP TS 29.500 V19.0.0 (Sep. 2024) (Year: 2024).*

(Continued)

*Primary Examiner* — Dung Hong
(74) *Attorney, Agent, or Firm* — Jenkins, Taylor & Hunt, P.A.

(57) ABSTRACT

A method for dynamically adjusting service-based interface (SBI) message priority for roaming traffic includes receiving, by a security edge protection proxy (SEPP), an SBI message destined for a network function (NF) located in an administrative domain. The method further includes determining, by the SEPP and based on an SBI message priority configuration of the administrative domain, an SBI message priority attribute value for the SBI message. The method further includes dynamically adjusting, by the SEPP and using the SBI message priority attribute value determined based on the SBI message priority configuration of the administrative domain, a priority attribute value in the SBI message. The method further includes forwarding, by the SEPP, the SBI message with the dynamically adjusted SBI message priority attribute value to the administrative domain.

20 Claims, 5 Drawing Sheets

(56) References Cited

U.S. PATENT DOCUMENTS

| | | | | |
|---|---|---|---|---|
| 2023/0179681 A1* | 6/2023 | Krishan | H04L 67/61 | 709/223 |
| 2024/0121199 A1* | 4/2024 | Krishan | H04L 47/11 | |
| 2025/0184881 A1* | 6/2025 | Olvera-Hernandez | H04L 67/51 | |

OTHER PUBLICATIONS

"3rd Generation Partnership Project; Technical Specification Group Core Network and Terminals; 5G System, Network Function Repository Services; Stage 3 (Release 19)", 3GPP TS 29.510 V19.0.0, Sep. 2024.

"3rd Generation Partnership Project; Technical Specification Group Core Network and Terminals; 5G System; Public Land Mobile Network (PLMN) Interconnection; Stage 3 (Release 19)." 3GPP TS 29.573, V19.0.0, pp. 1-162 (Sep. 2024).

"3rd Generation Partnership Project; Technical Specification Group Core Network and Terminals; 5G System; Technical Realization of Service Based Architecture; Stage 3 (Release 19)", 3GPP TS 29.500, V19.0.0, pp. 1-154 (Sep. 2024).

"3rd Generation Partnership Project; Technical Specification Group Core Network and Terminals; 5G System; Public Land Mobile Network (PLMN) Interconnection; Stage 3 (Release 18)", 3GPP TS 29.573 V18.8.0, pp. 1-153 (Sep. 2024).

Notification of Transmittal of the International Search Report and the Written Opinion of the International Searching Authority, or the Declaration for International Patent Application Serial No. PCT/US2025/053207 (Feb. 12, 2026).

* cited by examiner

METHODS, SYSTEMS, AND COMPUTER READABLE MEDIA FOR DYNAMICALLY ADJUSTING SERVICE-BASED INTERFACE (SBI) MESSAGE PRIORITY FOR ROAMING TRAFFIC

TECHNICAL FIELD

The subject matter described herein relates to prioritizing messages in communication networks. More particularly, the subject matter described herein relates to methods, systems, and computer readable media for dynamically adjusting SBI message priority for roaming traffic.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF service instance is a service instance of a producer NF that provides one or more services. A given producer NF may include more than one NF service instance. It should also be noted that multiple NF service instances can share the same service endpoint.

NFs register with an NF repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

Service communication proxies (SCPs) route messages between NF instances. An SCP can also invoke the NF discovery service operation to learn about available NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instance.

One problem that can occur in communication networks is that message priorities can be incorrectly set, which can cause messages to be throttled or discarded during overload conditions. For example, in 5G networks, when SBI messages cross an administrative domain, such as a public land mobile network (PLMN), the messages may include SBI message priority attribute values set by the sending domain, which are inconsistent with the SBI message priority attribute values of the receiving domain. As a result of the inconsistent SBI message priority attribute values, messages that are considered high priority in the sending administrative domain may be considered low priority in the receiving administrative domain (or vice-versa). During overload conditions in the receiving administrative domain, low priority messages may be dropped during overload conditions. The messages incorrectly considered as low priority messages may be discarded in the receiving administrative domain, even though these messages would not be dropped during overload conditions in the sending administrative domain.

In light of these and other difficulties, there exists a need for improved methods, systems, and computer readable media for dynamically adjusting message priorities for roaming traffic, i.e., traffic that crosses from one administrative domain into another administrative domain.

SUMMARY

A method for dynamically adjusting service-based interface (SBI) message priority for roaming traffic includes receiving, by a security edge protection proxy (SEPP), an SBI message destined for a network function (NF) located in an administrative domain. The method further includes determining, by the SEPP and based on an SBI message priority configuration of the administrative domain, an SBI message priority attribute value for the SBI message. The method further includes dynamically adjusting, by the SEPP and using the SBI message priority attribute value determined based on the SBI message priority configuration of the administrative domain, a priority attribute value in the SBI message. The method further includes forwarding, by the SEPP, the SBI message with the dynamically adjusted SBI message priority attribute value to the administrative domain.

According to another aspect of the subject matter described herein, the administrative domain comprises a public land mobile network (PLMN) and receiving an SBI message comprises receiving an inter-PLMN SBI message.

According to another aspect of the subject matter described herein, the administrative domain comprises a domain within the same public land mobile network (PLMN) as the SEPP and receiving an SBI message comprises receiving an intra-PLMN SBI message.

According to another aspect of the subject matter described herein, the method for dynamically adjusting SBI message priority for roaming traffic includes obtaining, by the SEPP and from a SEPP associated with the administrative domain, the SBI message priority configuration of the administrative domain.

According to another aspect of the subject matter described herein, determining the SBI priority attribute value for the SBI message includes determining the SBI message priority attribute value from the SBI message priority configuration obtained from the SEPP associated with the administrative domain.

According to another aspect of the subject matter described herein, obtaining the SBI message priority configuration from the SEPP associated with the administrative domain includes obtaining the SBI message priority configuration via an N32-c security capability exchange with the SEPP associated with the administrative domain.

According to another aspect of the subject matter described herein, obtaining the SBI message priority configuration via the N32-c security capability exchange includes receiving, from the SEPP associated with the administrative domain, an N32-c security capability exchange message including the SBI message priority configuration of the administrative domain and reading the SBI message priority configuration from the N32-c security capability exchange message.

According to another aspect of the subject matter described herein, the method for dynamically adjusting SBI message priority for roaming traffic includes, storing, by the SEPP, the SBI message priority configuration of the administrative domain and wherein determining the priority attribute value for the SBI message includes reading the priority attribute value from the SBI message priority configuration stored by the SEPP.

According to another aspect of the subject matter described herein, storing the SBI message priority configuration of the administrative domain includes storing the SBI message priority configuration in an SBI message priority configuration database including mappings between administrative domain identifiers, message types, uniform resource identifiers (URIs) and SBI message priority attribute values.

According to another aspect of the subject matter described herein, dynamically adjusting the SBI message priority attribute value includes setting the priority attribute value in the SBI message to a value that preserves an originating priority category of the SBI message in the administrative domain.

According to another aspect of the subject matter described herein, a system for dynamically adjusting service-based interface (SBI) message priority for roaming traffic includes a security edge protection proxy (SEPP) including at least one processor and a memory. The system further includes an SBI message priority adjuster implemented by the at least one processor for receiving an SBI message destined for a network function (NF) located in an administrative domain, determining, and based on an SBI message priority configuration of the administrative domain, an SBI message priority attribute value for the SBI message, dynamically adjusting, using the SBI message priority attribute value determined based on the SBI message priority configuration of the administrative domain, a priority attribute value in the SBI message, and forwarding the SBI message with the dynamically adjusted SBI message priority attribute value to the administrative domain.

According to another aspect of the subject matter described herein, the administrative domain comprises a public land mobile network (PLMN) and the SBI message comprises an inter-PLMN SBI message.

According to another aspect of the subject matter described herein, the administrative domain comprises a domain within the same public land mobile network (PLMN) as the SEPP and the SBI message comprises an intra-PLMN SBI message.

According to another aspect of the subject matter described herein, the SBI message priority adjuster is configured to obtain, from a SEPP associated with the administrative domain, the SBI message priority configuration of the administrative domain.

According to another aspect of the subject matter described herein, the SBI message priority adjuster is configured to determine the SBI message priority attribute value from the SBI message priority configuration obtained from the SEPP associated with the administrative domain.

According to another aspect of the subject matter described herein, the SBI message priority adjuster is configured to obtain the SBI message priority via an N32-c security capability exchange with the SEPP associated with the administrative domain.

According to another aspect of the subject matter described herein, the SBI message priority adjuster is configured to receive, from the SEPP associated with the administrative domain, an N32-c security capability exchange message including the SBI message priority configuration of the administrative domain and read the SBI message priority configuration from the N32-c security capability exchange message.

According to another aspect of the subject matter described herein, the SBI message priority adjuster is configured to store the SBI message priority configuration of the administrative domain and read the priority attribute value from the SBI message priority configuration stored by the SEPP.

According to another aspect of the subject matter described herein, the SBI message priority adjuster is configured to store the SBI message priority configuration of the administrative domain in an SBI message priority configuration database including mappings between administrative domain identifiers, message types, uniform resource identifiers (URIs), SBI message priority attribute values.

According to another aspect of the subject matter described herein, a non-transitory computer readable medium having stored thereon executable instructions that when executed by a processor of a computer control the computer to perform steps is provided. The steps include receiving, by a security edge protection proxy (SEPP), a service-based interface (SBI) message destined for a network function (NF) located in an administrative domain. The steps further include determining, by the SEPP and based on an SBI message priority configuration of the administrative domain, an SBI message priority attribute value for the SBI message. The steps further include dynamically adjusting, by the SEPP and using the SBI message priority attribute value determined based on the SBI message priority configuration of the administrative domain, a priority attribute value in the SBI message. The steps further include forwarding, by the SEPP, the SBI message with the dynamically adjusted SBI message priority attribute value to the administrative domain.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer-readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
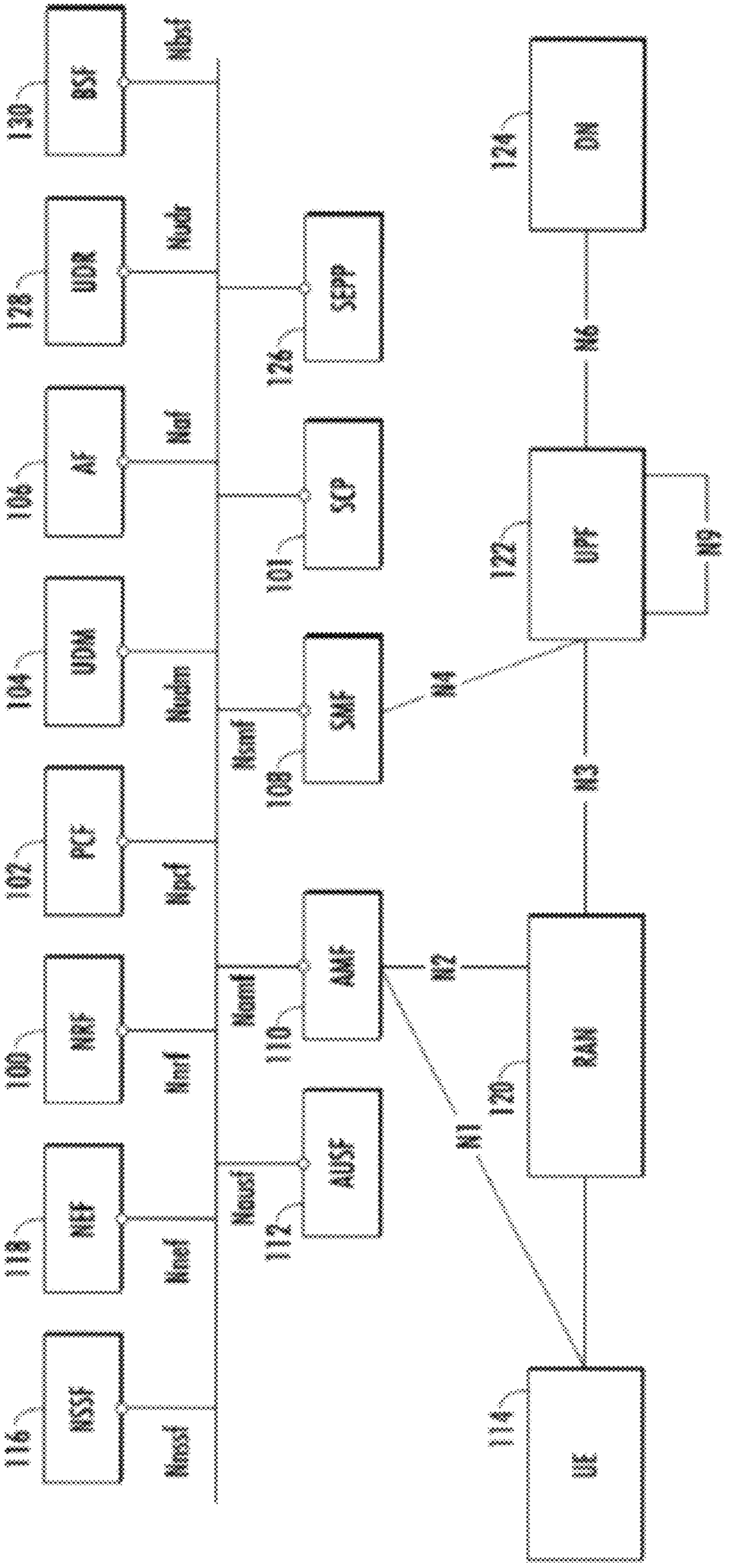
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to producer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As indicated above, one problem that can occur in communication networks is inconsistent setting of SBI message priority attribute values for roaming traffic, i.e., any SBI messages that cross administrative domains. All SBI requests cannot be treated the same during overload control when an NF is making throttling decisions, i.e., low priority messages should be throttled before high priority messages. With a view to provide differential treatment to high priority messages (such as SBI messages relating to mission critical service (MCX) and multimedia priority service (MPS)), 3GPP has defined the concept of SBI message priority, which is an attribute value conveyed by the 3gpp-Sbi-Message-Priority header in the message. Each network operator defines priorities to be used in the operator's administrative domain (PLMN) by the 5G NFs in the administrative domain. The SBI message priorities and the corresponding priority categories used in an administrative domain are referred to herein as an SBI message priority configuration of the administrative domain.

For inter-PLMN and intra-PLMN roaming scenarios, SBI messages travel from one administrative domain to another administrative domain. Since there is no well-defined procedure to align the configured priorities across administrative domains, there is a possibility that the SBI message priority attribute value used in one administrative domain (e.g., a visited PLMN) may not have the same meaning as in another administrative domain (e.g., a home PLMN). As a result, an SBI message may be treated differently than what was desired by the NF service consumer or NF service producer that originated the message.

The subject matter described herein provides for the negotiation and alignment of the SBI message priority between SEPPs according to the priorities for the target PLMN discovered via N32-c or manual configuration.

Section 6.8.1 of 3GPP TS 29.500 defines the SBI message priority mechanism. 3GPP TS 29.500 recommends using the SBI message priority to make throttling decisions related to overload control. For example, 3GPP TS 29.500 indicates that the primary usage of SBI message priority (SMP) is to provide guidance to 5GC NFs acting as HTTP/2 clients or servers and HTTP/2 proxies when making throttling decisions related to overload control. The priority information may also be used for routing in proxies. Eventually, a server may use the priority information to process higher-priority requests before lower-priority requests.

Figure 2:
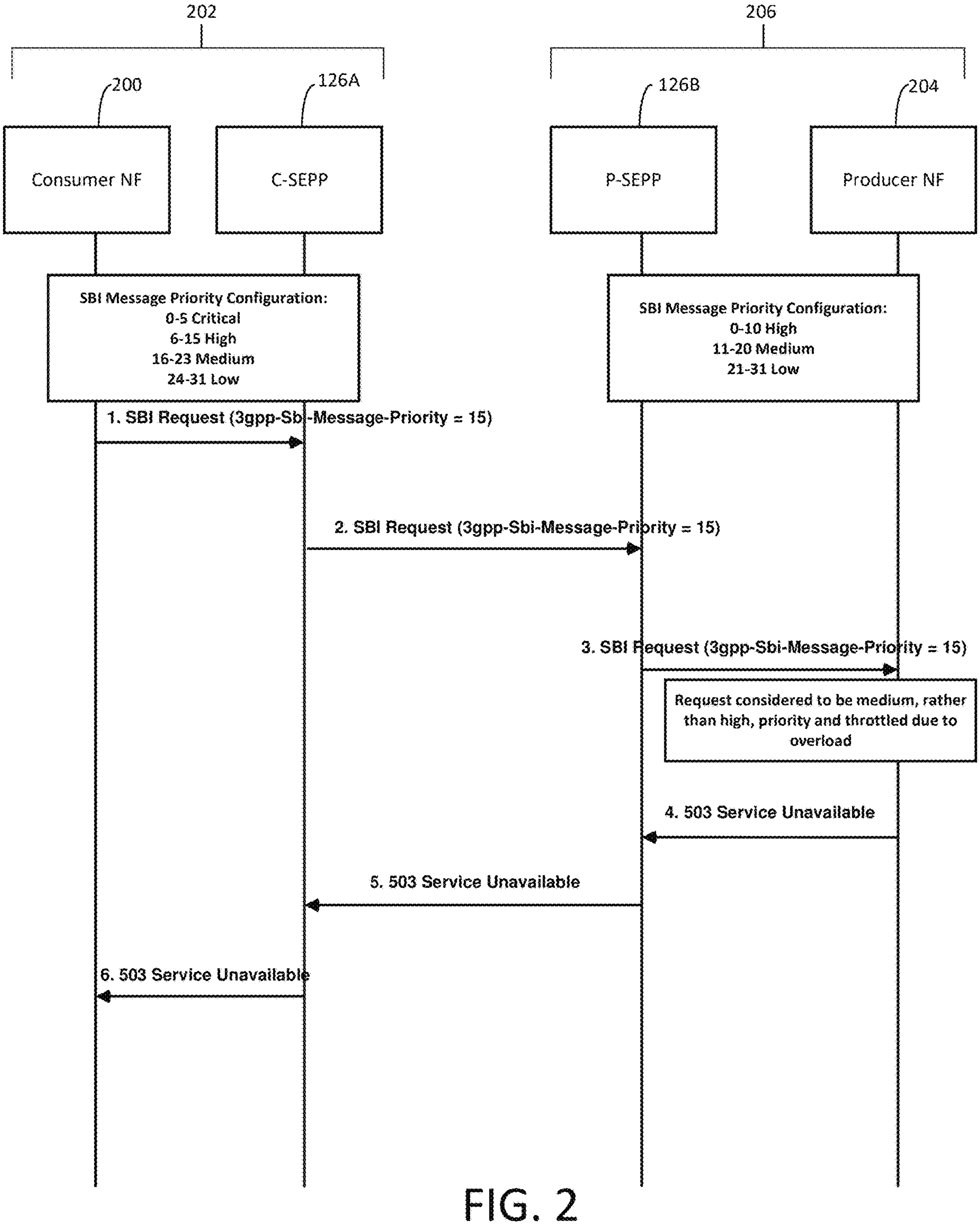
FIG. 2 is a message flow diagram illustrating throttling of roaming traffic due to differences in SBI priority configurations of administrative domains.

One problem is that SBI message priorities are operator-defined and are relative to each operator's network. The SBI message priority in an SBI message traveling from one administrative domain (e.g., a visited PLMN) to another administrative domain (e.g., a home PLMN) may lose its meaning due to the difference in priority configuration between the two administrative domains. FIG. 2 is a message flow diagram illustrating throttling of roaming traffic due to differences in SBI priority configurations of administrative domains. Referring to FIG. 2, a consumer NF 200 and a consumer SEPP (C-SEPP) 126A are assumed to be in a first administrative domain 202, and a producer NF 204 and a producer SEPP (P-SEPP) 126B are assumed to be in a second administrative domain 206 separate from the first administrative domain 202. Administrative domains 202 and 206 may be PLMNs managed by different network operators, different regions of the same PLMN managed by the same network operator, or any other portions of a network in which SBI message priority configurations are different. In the illustrated example, administrative domain 202 has the following SBI message priority configuration:

TABLE 1

SBI Message Prioirty Configuration for Administrative Domain 202

| SBI Message Priority Range | Priority Category |
|---|---|
| 0-5 | Critical |
| 6-15 | High |
| 16-23 | Medium |
| 24-31 | Low |

From Table 1, SBI message priority attribute values may range from 0-31, and lower SBI message priority attribute values correspond to higher priority messages. Table 2 shown below illustrates an exemplary message priority configuration for administrative domain 206.

TABLE 2

SBI Message Prioirty Configuration for Administrative Domain 206

| SBI Message Priority Range | Priority Category |
|---|---|
| 0-10 | High |
| 11-20 | Medium |
| 21-31 | Low |

From Tables 1 and 2, it can be seen that administrative domains 202 and 206 have different SBI message priority configurations, which may result in unintentional throttling or discarding of high priority messages during overload conditions.

Referring to the message flow in FIG. 2, in step 1, consumer NF 200 generates and sends an inter-PLMN SBI message to C-SEPP 126A. Consumer NF 200 sets the SBI message priority attribute value in the SBI message to 15, which indicates in administrative domain 202 that the message is a high priority message. In step 2, C-SEPP 126A receives the SBI message and forwards the message to P-SEPP 126B. In step 3, P-SEPP 126B forwards the SBI message to producer NF 204. Producer NF 204 receives the SBI message, reads the priority attribute value of 15 in the message, and discards the message because producer NF 204 is experiencing overload conditions, and a priority attribute value of 15 is considered medium priority in administrative domain 206. In step 4, producer NF 204 generates and sends a 503 service unavailable message to P-SEPP 126B. In step 5, P-SEPP 126B forwards the 503 service unavailable message to C-SEPP 126A. In step 6, C-SEPP 126A forwards the 503 service unavailable message to consumer NF 200. Thus, FIG. 2 illustrates the case where a high priority SBI request message was not prioritized consistently in the sending and receiving administrative domains due to different SBI message priority configurations in the sending and receiving administrative domains.

Figure 3:
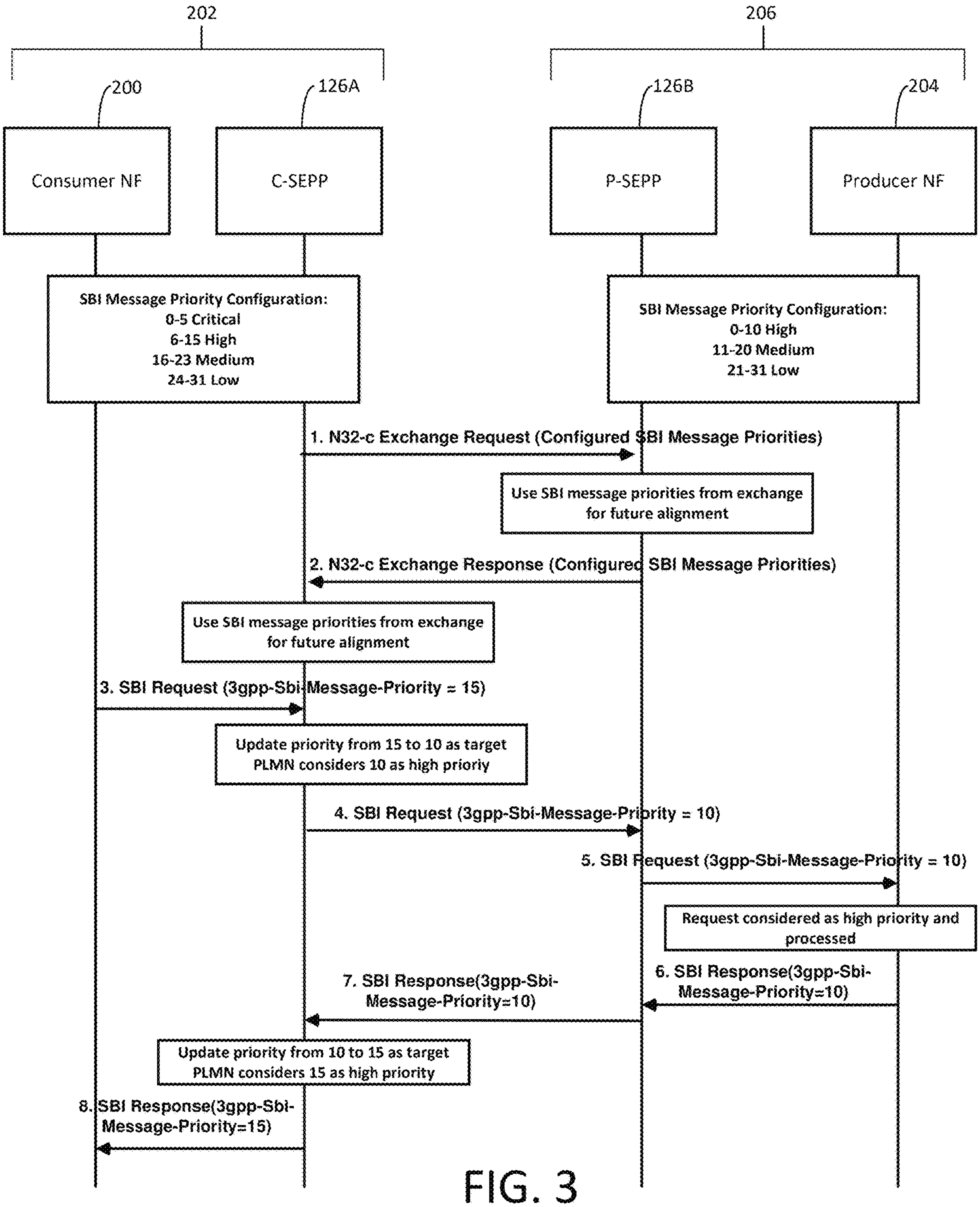
FIG. 3 is a message flow diagram illustrating exemplary messages exchanged for dynamic adjustment of SBI message priority attribute values for roaming traffic.

To reduce the likelihood of high priority messages not being treated consistently when the messages cross administrative domains, the subject matter described herein includes negotiation and alignment of the SBI message priority between SEPPs according to the priorities for the target administrative domain discovered via priority-enhanced N32-c messaging or manual configuration. FIG. 3 is a message flow diagram illustrating exemplary messages exchanged for dynamic adjustment of SBI message priority attribute values for roaming traffic. In FIG. 3, the SBI message priority configurations for administrative domains 202 and 206 are assumed to be the same as that illustrated above in Tables 1 and 2. Referring to the message flow in FIG. 3, in step 1, C-SEPP 126A sends an N32-c security capability exchange request message to P-SEPP 126B to establish security parameters over the N32-f interface used to carry messages between C-SEPP 126A and P-SEPP 126B. The security capability exchange request message is enhanced to include the SBI message priority configuration for administrative domain 202. For example, C-SEPP 126A may add a custom field to the SBI security capability exchange request message that carries the priority configuration illustrated above in Table 1 for administrative domain 202.

P-SEPP 126B receives the security capability exchange request message, reads the SBI message priority configuration for administrative domain 202, stores the SBI message priority configuration in memory local to P-SEPP 126B, and uses the SBI message priority configuration to adjust priorities of future messages destined for administrative domain 202. In step 2, P-SEPP 126B sends an N32-c security capability exchange response message to C-SEPP 126A. P-SEPP 126B enhances the N32-c security capability exchange response message to carry the SBI message priority configuration for administrative domain 206. C-SEPP 126A receives the security capability exchange response message, reads the SBI message priority configuration for administrative domain 206, stores the SBI message priority configuration in memory local to C-SEPP 126A, and uses the SBI message priority configuration to adjust priorities of future messages destined for administrative domain 206.

In step 3, consumer NF 200 generates and sends an inter-PLMN SBI request message to C-SEPP 126A. Consumer NF 200 sets the SBI message priority attribute value in the message to 15, indicating that the message is considered high priority in administrative domain 202. C-SEPP 126A receives the SBI request message, reads the priority attribute value as well as target administrative domain identification information from the SBI request message, and dynamically adjusts the value of the SBI message priority attribute in the SBI request message so that the SBI message priority category set for the message in the sending administrative domain will be consistent with the SBI message priority category in the target administrative domain. In the example illustrated in FIG. 3, C-SEPP 126A updates the value of the SBI message priority attribute in the message from 15 to 10 so that the message will be treated as a high priority message in the target administrative domain.

In step 4, C-SEPP 126A forwards the SBI request to P-SEPP 126B. In step 5, P-SEPP 126B forwards the message to producer NF 204. Producer NF 204 receives the message, reads the updated priority attribute value, and treats the message as a high priority message by processing, rather than throttling or discarding, the message. In step 6, producer NF 204 generates and sends an SBI response message to P-SEPP 126B. Producer NF 204 sets the SBI message priority attribute value in the SBI response message to 10, indicating that the SBI response message is a high-priority message. P-SEPP 126B receives the SBI response message, reads the priority attribute value, reads target administrative domain identifying information from the message, dynamically adjusts the priority attribute value in the SBI response message so that the priority category of the SBI response message in the originating administrative domain will be maintained in the target administrative domain, and, in step 7, forwards the SBI response message to C-SEPP 126A. C-SEPP 126A receives the SBI response message, and, in step 8, forwards the SBI response message to consumer NF 200. Consumer NF 200 receives the SBI response message, reads the adjusted priority attribute value from the message, and processes the message as a high priority message as indicated by the updated priority attribute value.

Figure 4:
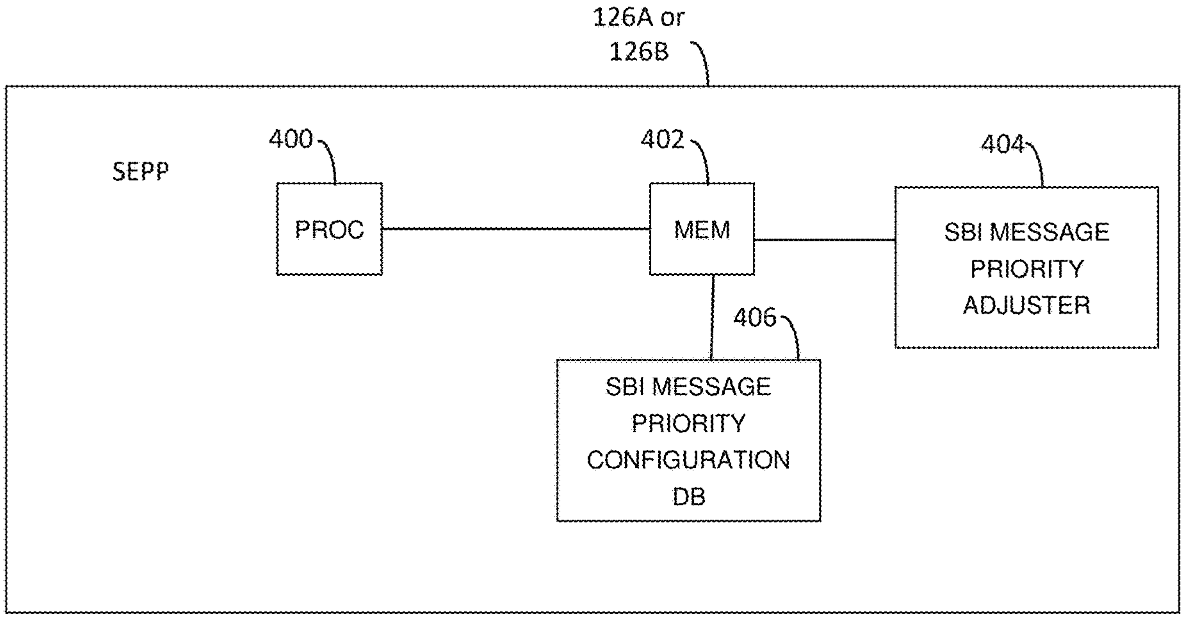
FIG. 4 is a block diagram illustrating an exemplary architecture for a SEPP for performing dynamic adjustment of SBI message priority attribute values for roaming traffic.

FIG. 4 is a block diagram illustrating an exemplary architecture for a SEPP for performing dynamic adjustment of SBI message priority attribute values for roaming traffic. Referring to FIG. 4, a SEPP, such as C-SEPP or P-SEPP 126A or 126B includes at least one processor 400 and a memory 402. C-SEPP or P-SEPP 126A or 126B further includes an SBI message priority adjuster 404 that adjusts SBI message priorities of messages that will cross administrative domains, such as PLMNs or regions within an operator's network. C-SEPP or P-SEPP 126A or 126B further includes an SBI message priority configuration database 406 that stores SBI message priority configurations of different administrative domains. The data stored in SBI message priority configuration database 406 may be dynamically populated through the exchange of priority-configuration-enhanced N32-c messaging. Alternatively, the SBI message priority configurations stored in database 406 may be manually configured by the network operator. Table 3 shown below illustrates an example of priority configuration data that may be configured in SBI message priority configuration database 406 via manual configuration for an administrative domain PLMN2.

TABLE 3

SBI Message Priority Configuration for PLMN2

| PLMN ID | MESSAGE TYPE | METHOD | URI | PRIORITY |
|---|---|---|---|---|
| PLMN2 | REQ | PUT | . . . / xyz.com | 13 |
| PLMN2 | RSP | PUT | . . . / xyz.com | 13 |
| . . . | . . . | . . . | . . . | . . . |

From Table 3, it can be seen that the priority configuration for PLMN2 can be set according to message type, HTTP method, and target URI. Other message attribute values may be used to set SBI message priority attribute values without departing from the scope of the subject matter described herein.

When the SBI message priority configuration data is obtained via the exchange of N32-c messages, the SBI message priority configuration stored in SBI message priority database 406 may include message priority attribute value ranges and priority categories indexed by administrative domain ID. For example, if C-SEPP 126A illustrated in FIG. 3 obtains the SBI message priority configuration data for administrative domain 206, C-SEPP 126A may store the data illustrated above in Table 2 in SBI message priority configuration database 406.

Figure 5:
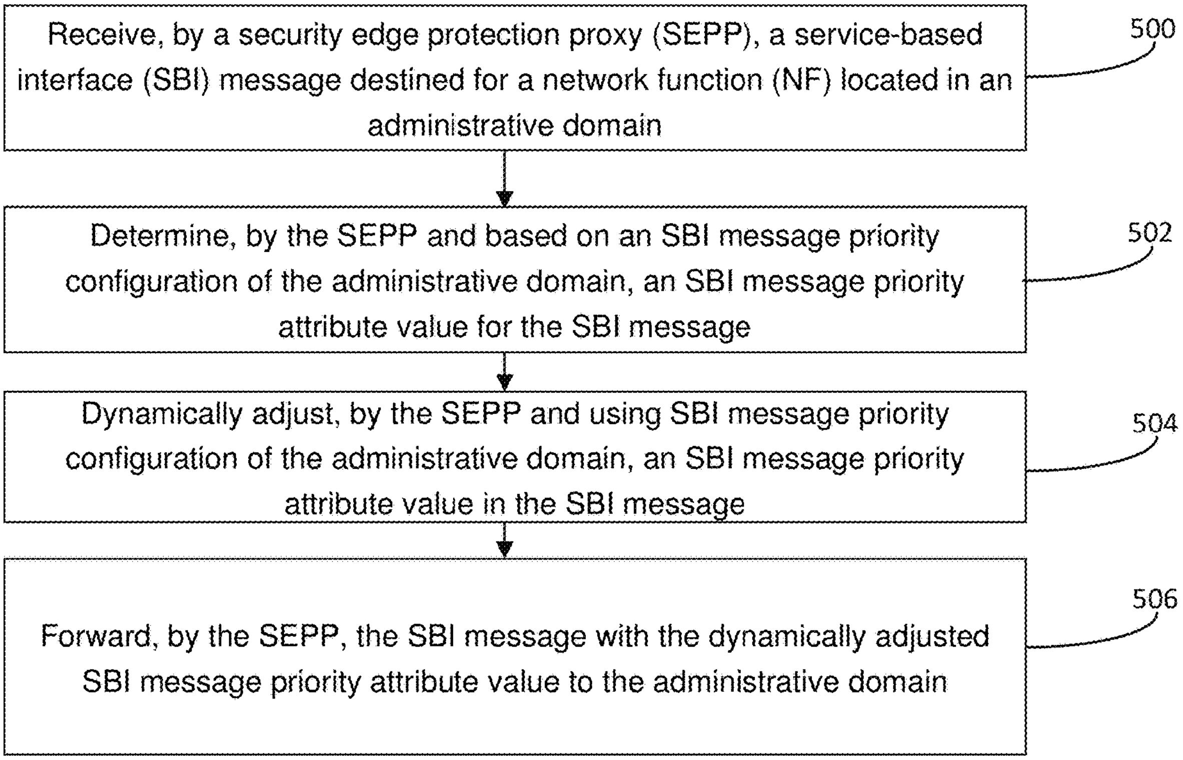
FIG. 5 is a flow chart illustrating an exemplary process for dynamic adjustment of SBI message priority attribute values for roaming traffic.

FIG. 5 is a flow chart illustrating an exemplary process for dynamic adjustment of SBI message priority attribute values for roaming traffic. Referring to FIG. 5, in step 500, the process includes receiving, by a security edge protection proxy (SEPP), a service-based interface (SBI) message destined for a network function (NF) located in an administrative domain. For example, a SEPP, such as C-SEPP 126A, may receive, from an NF service consumer, an SBI request message with a 3gpp-Sbi-Message-Priority attribute value set based on the SBI message priority configuration of the sending administrative domain.

In step 502, the process further includes determining, by the SEPP and from an SBI message priority configuration of the administrative domain, an SBI message priority attribute value for the SBI message. For example, a SEPP, such as C-SEPP 126A, may read target domain identifying information, such as a PLMN or region ID, from the 3gpp-Sbi-Target-apiRoot header of the message and use the target domain or region identifying information to perform a lookup in SBI message priority configuration database 406, locate a matching record, and read the target domain SBI message priority configuration from the record. The SEPP may then determine the SBI message priority attribute value for the message using the SBI message priority configuration obtained from priority configuration database 406 so that the priority category (e.g., critical, high, medium, or low) of the message will not change when the message enters the target administrative domain.

In step 504, the process further includes dynamically adjusting, by the SEPP and using the priority attribute value determined from the SBI message priority configuration of the administrative domain, an SBI message priority attribute value in the SBI message. For example, a SEPP, such as C-SEPP 126A, may change the 3gpp-Sbi-Message-Priority attribute value in the SBI request (or response) message to the value determined in step 502.

In step 506, the process further includes forwarding, by the SEPP, the SBI message with the dynamically adjusted SBI message priority attribute value to the administrative domain. For example, a SEPP, such as C-SEPP 126A, may forward the SBI request or response message with the adjusted SBI message priority attribute value to the SEPP associated with the target administrative domain.

Exemplary advantages of the subject matter described herein include increasing the likelihood of consistent message prioritization of SBI messages that cross administrative domains. Such consistent prioritization may result in fewer SBI messages being discarded during overload conditions. The subject matter described herein may also increase network resiliency by reducing the likelihood of discarding high priority messages over lower priority messages.

The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 19) 3GPP TS 29.510 V19.0.0 (2024-09)
2. 3rd Generation Partnership Project; Technical Specification Group Core Network and Terminals; 5G System; Public Land Mobile Network (PLMN) Interconnection; Stage 3 (Release 19) 3GPP TS 29.573 V19.0.0 (2024-09)
3. 3rd Generation Partnership Project; Technical Specification Group Core Network and Terminals; 5G System; Technical Realization of Service Based Architecture; Stage 3 (Release 19) 3GPP TS 29.500 V19.0.0 (2024-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for dynamically adjusting service-based interface (SBI) message priority for roaming traffic, the method comprising:

receiving, by a security edge protection proxy (SEPP), an SBI message destined for a network function (NF) located in an administrative domain;

determining, by the SEPP and based on an SBI message priority configuration of the administrative domain, an SBI message priority attribute value for the SBI message;

dynamically adjusting, by the SEPP and using the SBI message priority attribute value determined based on the SBI message priority configuration of the administrative domain, a priority attribute value in the SBI message; and forwarding, by the SEPP, the SBI message with the dynamically adjusted SBI message priority attribute value to the administrative domain.

2. The method of claim 1 wherein the administrative domain comprises a public land mobile network (PLMN) and receiving an SBI message comprises receiving an inter-PLMN SBI message.

3. The method of claim 1 wherein the administrative domain comprises a domain within a same public land mobile network (PLMN) as the SEPP and receiving an SBI message comprises receiving an intra-PLMN SBI message.

4. The method of claim 1 comprising obtaining, by the SEPP and from a SEPP associated with the administrative domain, the SBI message priority configuration of the administrative domain.

5. The method of claim 4 wherein determining the SBI priority attribute value for the SBI message includes determining the SBI message priority attribute value from the SBI message priority configuration obtained from the SEPP associated with the administrative domain.

6. The method of claim 4 wherein obtaining the SBI message priority configuration from the SEPP associated with the administrative domain includes obtaining the SBI message priority configuration via an N32-c security capability exchange with the SEPP associated with the administrative domain.

7. The method of claim 6 wherein obtaining the SBI message priority configuration via the N32-c security capability exchange includes receiving, from the SEPP associated with the administrative domain, an N32-c security capability exchange message including the SBI message priority configuration of the administrative domain and reading the SBI message priority configuration from the N32-c security capability exchange message.

8. The method of claim 1 comprising, storing, by the SEPP, the SBI message priority configuration of the administrative domain and wherein determining the priority attribute value for the SBI message includes reading the priority attribute value from the SBI message priority configuration stored by the SEPP.

9. The method of claim 8 wherein storing the SBI message priority configuration of the administrative domain includes storing the SBI message priority configuration in an SBI message priority configuration database including mappings between administrative domain identifiers, message types, uniform resource identifiers (URIs) and SBI message priority attribute values.

10. The method of claim 1 wherein dynamically adjusting the SBI message priority attribute value includes setting the priority attribute value in the SBI message to a value that preserves an originating priority category of the SBI message in the administrative domain.

11. A system for dynamically adjusting service-based interface (SBI) message priority for roaming traffic, the system comprising:

a security edge protection proxy (SEPP) including at least one processor and a memory; and an SBI message priority adjuster implemented by the at least one processor for receiving an SBI message destined for a network function (NF) located in an administrative domain, determining, based on an SBI message priority configuration of the administrative domain, an SBI message priority attribute value for the SBI message, dynamically adjusting, using the SBI message priority attribute value determined based on the SBI message priority configuration of the administrative domain, a priority attribute value in the SBI message, and forwarding the SBI message with the dynamically adjusted SBI message priority attribute value to the administrative domain.

12. The system of claim 11 wherein the administrative domain comprises a public land mobile network (PLMN) and the SBI message comprises an inter-PLMN SBI message.

13. The system of claim 11 wherein the administrative domain comprises a domain within a same public land mobile network (PLMN) as the SEPP and the SBI message comprises an intra-PLMN SBI message.

14. The system of claim 11 wherein the SBI message priority adjuster is configured to obtain, from a SEPP associated with the administrative domain, the SBI message priority configuration of the administrative domain.

15. The system of claim 14 wherein the SBI message priority adjuster is configured to determine the SBI message priority attribute value from the SBI message priority configuration obtained from the SEPP associated with the administrative domain.

16. The system of claim 14 wherein the SBI message priority adjuster is configured to obtain the SBI message priority configuration via an N32-c security capability exchange with the SEPP associated with the administrative domain.

17. The system of claim 16 wherein the SBI message priority adjuster is configured to receive, from the SEPP associated with the administrative domain, an N32-c security capability exchange message including the SBI message priority configuration of the administrative domain and read the SBI message priority configuration from the N32-c security capability exchange message.

18. The system of claim 11 wherein the SBI message priority adjuster is configured to store the SBI message priority configuration of the administrative domain and read the priority attribute value from the SBI message priority configuration stored by the SEPP.

19. The system of claim 18 wherein the SBI message priority adjuster is configured to store the SBI message priority configuration of the administrative domain in an SBI message priority configuration database including mappings between administrative domain identifiers, message types, uniform resource identifiers (URIs), and SBI message priority attribute values.

20. A non-transitory computer readable medium having stored thereon executable instructions that when executed by a processor of a computer control the computer to perform steps comprising:

receiving, by a security edge protection proxy (SEPP), a service-based interface (SBI) message destined for a network function (NF) located in an administrative domain;

determining, by the SEPP and based on an SBI message priority configuration of the administrative domain, an SBI message priority attribute value for the SBI message;

dynamically adjusting, by the SEPP and using the SBI message priority attribute value determined based on the SBI message priority configuration of the administrative domain, a priority attribute value in the SBI message; and forwarding, by the SEPP, the SBI message with the dynamically adjusted SBI message priority attribute value to the administrative domain.

* * * * *